United States Patent [19]
Endo et al.

[11] Patent Number: 5,640,178
[45] Date of Patent: Jun. 17, 1997

[54] POINTING DEVICE

[75] Inventors: Michiko Endo; Mieko Kawamoto; Takashi Arita; Masanori Okahashi, all of Kawasaki, Japan

[73] Assignee: Fujitsu Limited, Kawasaki, Japan

[21] Appl. No.: 517,124

[22] Filed: Aug. 21, 1995

[30] Foreign Application Priority Data

Sep. 16, 1994 [JP] Japan .................. 6-222234

[51] Int. Cl.⁶ .................................................. G06F 3/033
[52] U.S. Cl. ............................................................ 345/161
[58] Field of Search ............................... 345/156, 157, 345/158, 178, 184, 161, 162, 164, 168; 341/34

[56] References Cited

U.S. PATENT DOCUMENTS 4,680,577  7/1987  Straayer et al. .................. 340/711
5,489,900  2/1996  Cali et al. ............................ 341/34
5,499,041  3/1996  Brandenburg et al. .......... 345/174

FOREIGN PATENT DOCUMENTS

| 59-075104 | 4/1984 | Japan . |
| 59-075676 | 4/1984 | Japan . |
| 61-275605 | 12/1986 | Japan . |
| 62-189526 | 8/1987 | Japan . |

*Primary Examiner*—Mark R. Powell
*Attorney, Agent, or Firm*—Staas & Halsey

[57] ABSTRACT

A pointing device includes a resilient substrate having flat upper and lower surfaces, a plurality of strain gages integrally formed on at least one of the upper and lower surfaces of the substrate, and a stick having a base connected to a central portion on the upper surface of the substrate, and a tip end opposite the base and displaceable in an arbitrary direction. The stick extends perpendicularly to the upper surface of the substrate. A displacement direction and a displacement quantity of the tip end of the stick are detectable from outputs of the strain gages.

23 Claims, 13 Drawing Sheets

FIG. 18
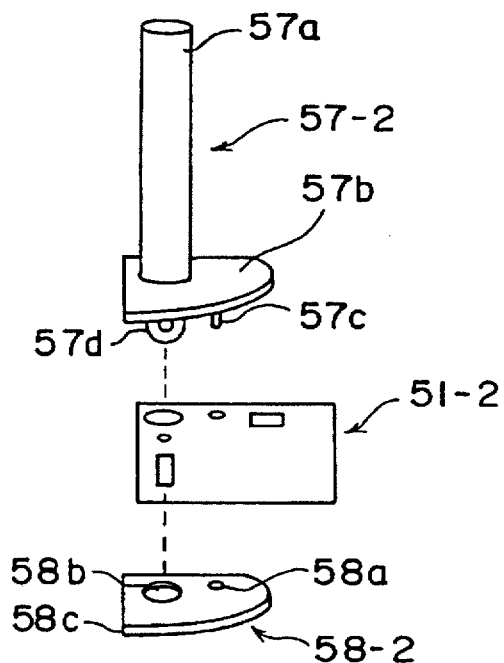
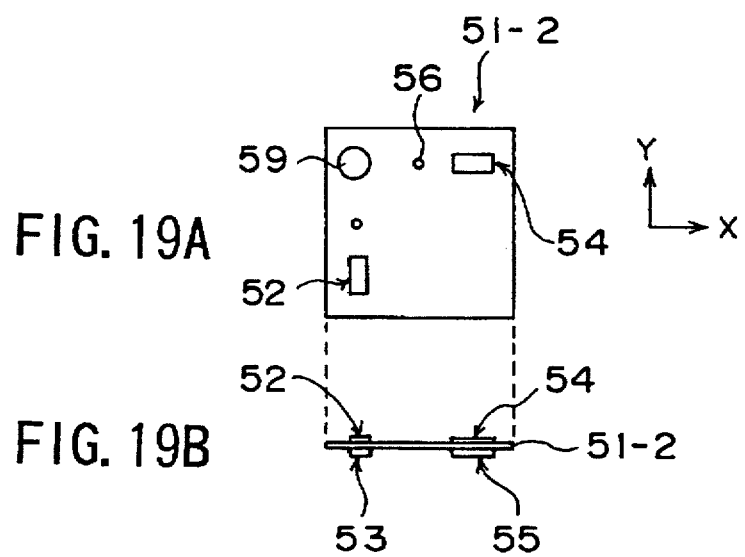
FIG. 19A
FIG. 19B

POINTING DEVICE

BACKGROUND OF THE INVENTION

The present invention generally relates to pointing devices and, more particularly, to a pointing device which is used to move a pointer or cursor on a display of a computer or the like to an arbitrary position on a display screen.

Generally, the input and output of data, in data processing by a computer, are carried out interactively. For example, the input is made from a keyboard of the computer and the pointing device is manipulated while displaying data such as characters and graphics on the display screen, such as a cathode ray tube (CRT), so as to move the pointer or cursor to an arbitrary position on the display screen. A digitizer, a mouse, a lightpen and a track ball are examples of the pointing device. The interactive data input and output are often used in fields including computer aided design (CAD) which processes data such as graphics, computer aided manufacturing (CAM), and simulation.

Recently, in addition to the keyboard, it has become popular to use the pointing device as the data input device in fields such as data processing and office automation (OA). The reason for the popular use of the pointing device is due to the extremely convenient operation of operating systems (OS) and application software which carry out processes in response to interactive operations for which the use of the pointing device is essential. For example, window operations and icon operations are examples of the interactive operations.

On the other hand, the computer is not necessarily limited to the desk-top type having independent computer body, keyboard and display. Recently, portable computers such as the lap-top type, notebook type and palm-top type have become popular, and such portable computers have an integrated computer body, keyboard and display. The portable computer such as the lap-top type is convenient to carry because it is light and compact.

However, due to the emergence of the portable computers such as the lap-top type, the environment in which the pointing device is used has become more varied. In other words, in the desk-top type computer, the pointing device simply needed to be placed on the desk top similarly to the computer, and manipulated on the desk top. However, for the portable computer, it is necessary to manipulate the pointing device in a state where the computer is placed on the user's lap top or hand.

For this reason, it is desirable that the pointing device used with the portable computer does not require a set-up area, like the mouse and digitizer used with the desk-top type computer, and that the pointing device used with the portable computer, instead, can be assembled within the portable computer. In addition, there is also a demand to reduce the set-up area, on the desk top, of the pointing device that is used with the desk-top type computer, and it is desirable to assemble the pointing device within the computer in order to meet such a demand.

FIG. 1 is a perspective view showing an example of a conventional pointing device.

In FIG. 1, a rectangular column-shaped stick 502 is made of a resin, and a base portion of this stick 502 is fixed on a base 501 of a keyboard or the like. The stick 502 has a square cross section, and a strain gage 504 is provided on each side surface of the stick 502. Only 2 strain gages 502 are shown in FIG. 1.

When the operator places his finger tip on the tip end of the stick 502 and displaces the tip end in an arbitrary direction, a strain dependent on the force applied on the tip end of the stick 502 is generated at each strain gage 504. Since the resistance of the strain gage 504 changes depending on the degree of strain, it is possible to determine the moving direction and moving distance of the cursor or pointer on the display screen based on the changes in the resistances of each of the strain gages 504 by detecting the change in the resistance of each strain gage 504.

However, in the conventional pointing device, each strain gage 504 must be adhered on the corresponding side surface of the stick 502. For this reason, there were problems in that it takes time to adhere the strain gages 504 on the stick 502, the adhering process makes it difficult to mass-produce the pointing device, and it is difficult to produce the pointing device at a low cost. In addition, since the strain gage 504 is adhered on the side surface of the stick 502 by use of an adhesive agent or the like, a mounting error is inevitably introduced among the strain gages 504, and there was a problem in that the strain detecting accuracy is poor. These problems of the conventional pointing device became more conspicuous as the size of the pointing device became smaller.

On the other hand, it is conceivable to directly form each strain gage 504 on the side surface of the stick 502 using techniques such as evaporation and sputtering. In this case, it is necessary to uniformly control the film thickness of the pattern which forms the strain gage 504 at each side surface of the stick 502 so that the characteristics of each of the strain gages 504 will be approximately the same. However, when forming the strain gage 504 by evaporation or sputtering, it is extremely difficult to uniformly control the film thickness at each of the side surfaces of the stick 502. For this reason, the characteristics of the strain gages 504 that are formed by the evaporation or sputtering will become inconsistent, and the strain detecting accuracy will become poor.

In addition, when directly forming each strain gage 504 on the corresponding side surface of the stick 502, it becomes necessary to use a special jig to hold the stick 502 while the evaporation or sputtering is carried out. In this case, it takes time to carry out the operation of fixing the stick 502 on the special jig, and the pointing device becomes unsuited for mass production and it is difficult to produce the pointing device at a low cost.

SUMMARY OF THE INVENTION

Accordingly, it is a general object of the present invention to provide a novel and useful pointing device in which the problems described above are eliminated.

Another and more specific object of the present invention is to provide a pointing device comprising a resilient substrate having flat upper and lower surfaces, a plurality of strain gages integrally formed on at least one of the upper and lower surfaces of the substrate, and a stick having a base connected to a central portion on the upper surface of the substrate, and a tip end opposite the base and displaceable in an arbitrary direction, where the stick extends perpendicularly to the upper surface of the substrate, and a displacement direction and a displacement quantity of the tip end of the stick are detectable from outputs of the strain gages. The strain gages are arranged with a predetermined angular separation between the adjacent strain gages. For example, when four strain gages are provided, the predetermined angular separation is 90°. When three strain gages are provided, the predetermined angular separation is 120°, for example. According to the pointing device of the present invention, the construction is simple and the strain gages can be formed on a single substrate by a process such as printing. As a result it is possible to realize a pointing device that is inexpensive and is suited for mass production. In addition, it is possible to realize a high strain detection accuracy.

Other objects and further features of the present invention will be apparent from the following detailed description when read in conjunction with the accompanying drawings.

BRIEF DESCRIPTION OF THE DRAWINGS

FIG. 18 is a disassembled perspective view showing a seventh embodiment of the pointing device according to the present invention;

FIGS. 19A and 19B respectively are diagrams showing a substrate of the seventh embodiment;

DESCRIPTION OF THE PREFERRED EMBODIMENTS

Figure 1:
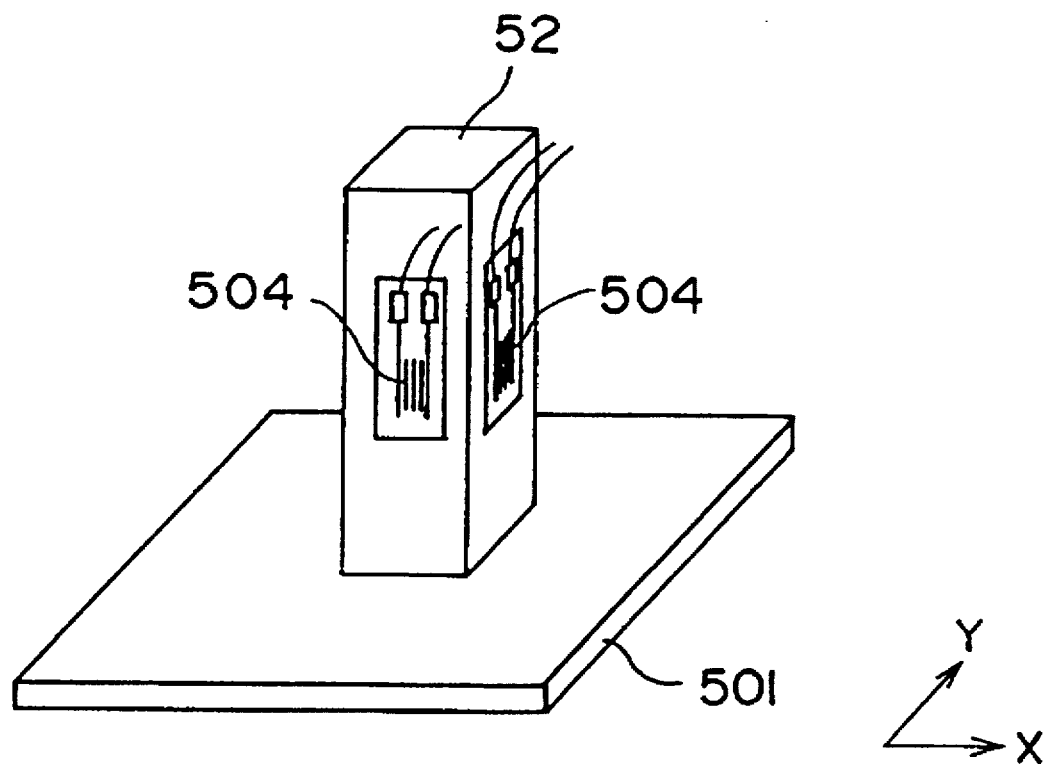
FIG. 1 is a perspective view showing an example of a conventional pointing device.
Figure 2:
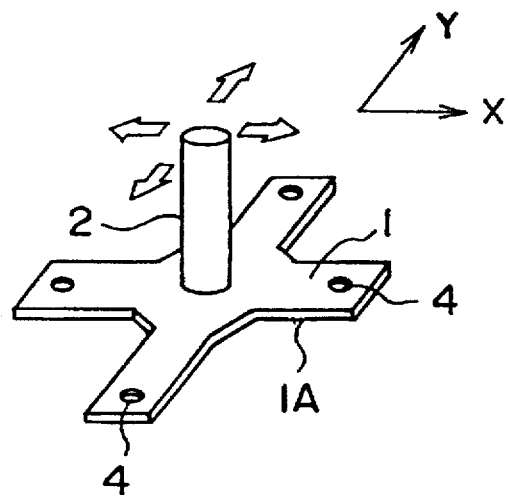
FIG. 2 is a perspective view showing a first embodiment of a pointing device according to the present invention.
Figure 3:
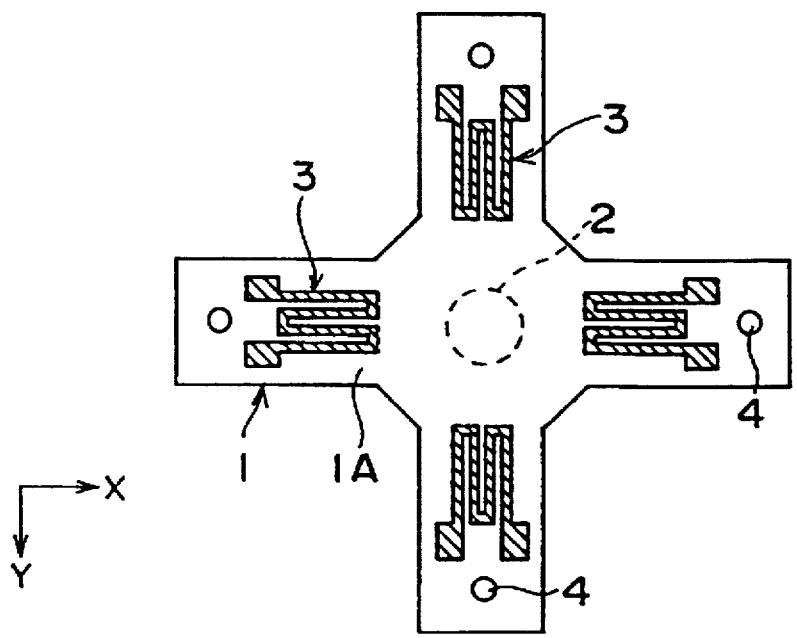
FIG. 3 is a bottom view showing a substrate of the first embodiment.
Figure 4:
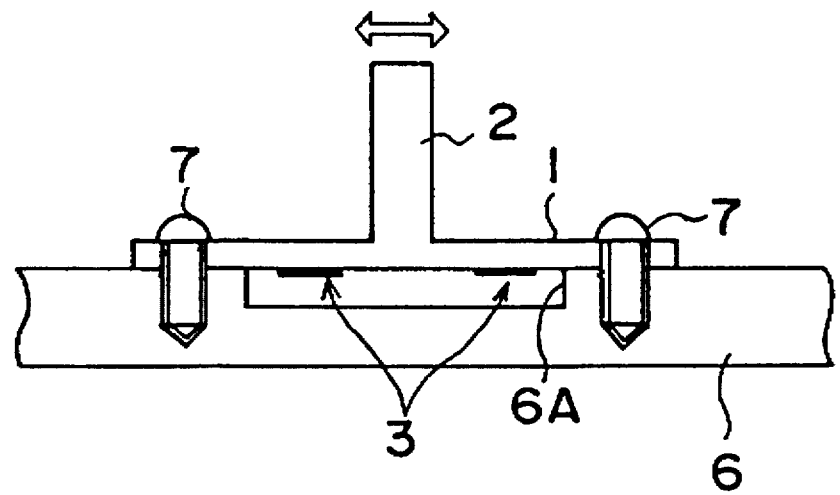
FIG. 4 is a cross sectional view showing an initial state where no force is applied on a tip end of a stick of the first embodiment.
Figure 5:
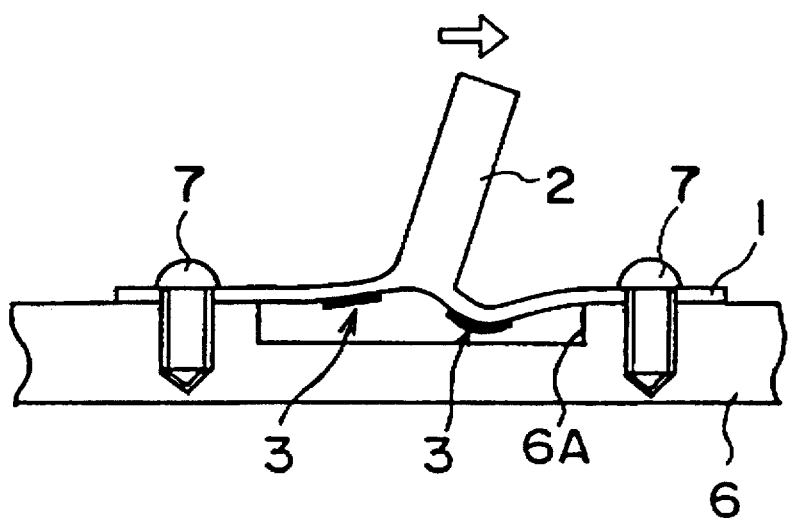
FIG. 5 is a cross sectional view showing a state where a force is applied on the tip end of the stick of the first embodiment.

First, a description will be given of a first embodiment of a pointing device according to the present invention, by referring to FIGS. 2 through 5. FIG. 2 shows a perspective view of the first embodiment, and FIG. 3 shows a bottom view of a lower surface of a substrate of the first embodiment. FIG. 4 is a cross sectional view showing an initial state where no force is applied on a stick of the first embodiment, and FIG. 5 is a cross sectional view showing a state where a force is applied on the stick of the first embodiment.

As shown in FIG. 2, the pointing device generally includes a substrate 1 and a stick 2. The substrate 1 is made of a resilient insulator material such as a resin and, in this embodiment, this substrate 1 has a generally cross-shape. Upper and lower surfaces of the substrate 1 are flat. In addition, the stick 2 is also made of a flexible material such as a resin. The substrate 1 and the stick 2 may be from the same resin, as a one-piece element, or may be made up of independent members. In the latter case, the stick 2 is fixed to the central portion of the substrate 1 by use of an adhesive agent or the like. Since both the substrate 1 and the stick 2 are resilient, the stick 2 can easily be displaced in an arbitrary direction including directions X and Y indicated by arrows in FIG. 2 when an operator places his finger tip on a tip end of the stick 2 and applies a force on the tip end of the stick 2.

As shown in FIGS. 2 and 3, mounting holes 4 are provided at the outer peripheral portion of the substrate 1. In addition, as shown in FIG. 3, four strain gages 3 are formed on a lower surface 1A of the substrate 1. The four strain gages 3 are provided to detect the displacement of the stick 2 in directions +X, −X, +Y and −Y and to detect the displacement quantity, or amount (i.e., the extent of displacement). The strain gages 3 may be printed on the lower surface 1A of the substrate 1 in one (i.e., a single) process by evaporation, sputtering or the like. Accordingly, the four strain gages 3 can be formed under the same conditions, and the inconsistency of the characteristics among the strain gages 3 can be suppressed to a minimum, thereby making it possible to realize a high strain detection accuracy. Further, since four strain gages 3 can be formed in one process, the pointing device is suited for mass production, and the pointing device can be produced at a low cost. Moreover, because the strain gages 3 are formed directly on the lower surface 1A of the substrate 1, a mounting error will not occur among the strain gages 3.

As shown in FIG. 4, the pointing device is mounted on a base 6 of a keyboard (not shown) or the like by screws 7 which penetrate the holes 4 in the substrate 1. A recess 6A is provided on the upper surface of the base 6 in a portion at least corresponding to the positions of the strain gages 3 formed on the lower surface 1A of the substrate 1. Hence, even when the tip end of the stick 2 is displaced in an arbitrary direction as shown in FIG. 5, the provision of the recess 6A enables the substrate 1 including the strain gages 3 to freely deform resiliently. Of course, the pointing device may be mounted on the base 6 by means other than the screws 7. For example, the pointing device may be fixed on the base 6 by locking means or adhering means provided on the base 6, and in such a case, the positioning means is not limited to the holes 4.

In the initial state shown in FIG. 4, no strain is introduced in any of the strain gages 3. In this initial state, when the operator places his finger tip on the tip end of the stick 2 and applies a force on this tip end so as to tilt the stick 2 towards the right in FIG. 5, for example, a tensile strain (force) is introduced at the right strain gage 3 and a compressive strain (force) is introduced at the left strain gage 3 in FIG. 5. When a strain occurs at the strain gage 3, the resistance of the strain gage 3 changes by an amount corresponding to the strain. Hence, by detecting the changes in the resistances of each of the strain gages 3, it is possible to detect the magnitude and direction of the force applied on the tip end of the stick 2, that is, the moving direction and moving distance of the cursor or pointer on the display screen.

Known methods may be used as the method of detecting the change in the resistance of each strain gage 3, and the method of determining the moving direction and moving distance of the cursor or pointer on the display screen based on the detected changes in the resistances of each of the strain gages 3. Accordingly, illustration and description related to the method of detecting the change in the resistance of each strain gage 3 and the method of determining the moving direction and moving distance of the cursor or pointer on the display screen based on the detected changes in the resistances of each of the strain gages 3 will be omitted in this specification. Examples of such methods are proposed in a U.S. Pat. No. 4,680,577, for example.

Figure 6:
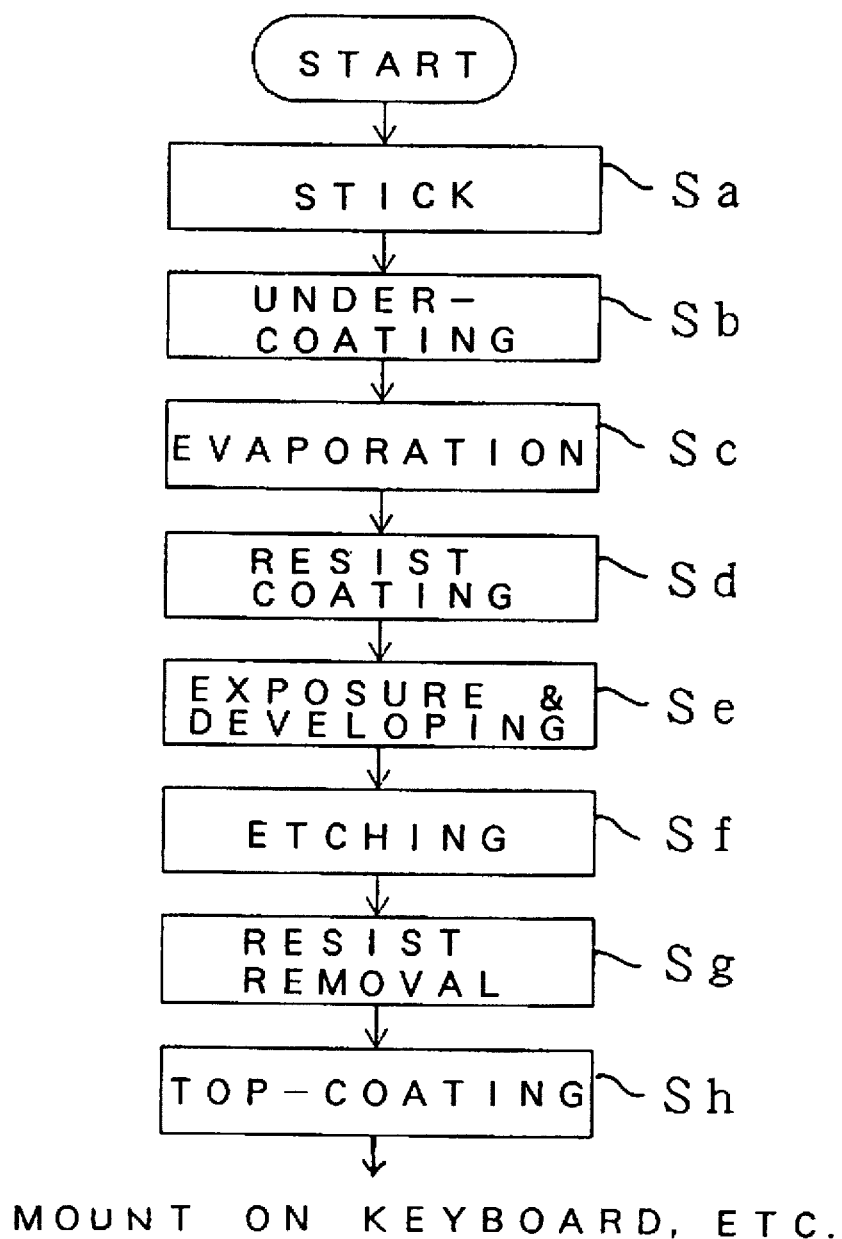
FIG. 6 is a flow chart for explaining an embodiment of a method of producing the pointing device.

Next, a description will be given of an embodiment of a method of producing the first embodiment of the pointing device, by referring to FIGS. 6 and 7. FIG. 6 is a flow chart for explaining the embodiment of the method, and FIGS. 7A through 7H respectively are cross sectional views for explaining processes of the embodiment of the method.

Figure 7A:
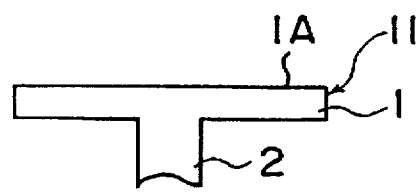
FIGS. 7A through 7H respectively are cross sectional views for explaining processes of the embodiment of the method shown in FIG. 6.

A step Sa shown in FIG. 6 sets a resin stick member 11 integrally having the substrate 1 and the stick 2 in a jig so that the lower surface 1A of the substrate 1 faces up, as shown in FIG. 7A. When mass production is considered, it is desirable that a plurality of resin stick members 11 are set in this manner.

Figure 7B:
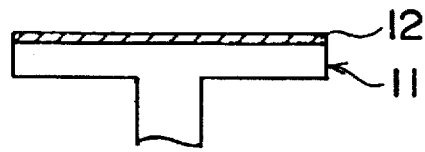

A step Sb shown in FIG. 6 forms an under-coat layer 12 on the lower surface 1A of the substrate 1 as shown in FIG. 7B, by coating an under-coat material using a spin coater or a roll coater.

Figure 7C:
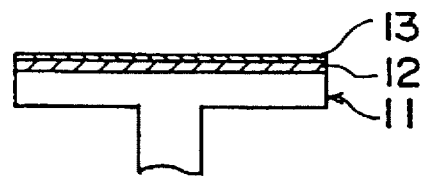

A step Sc shown in FIG. 6 forms a strain gage layer 13 on the under-coat layer 12 as shown in FIG. 7C by evaporation, for example. This strain gage layer 13 is made of CuNi, for example, and the strain gage layer 13 is formed to a thickness of 1000Å to 5000Å, for example.

Figure 7D:
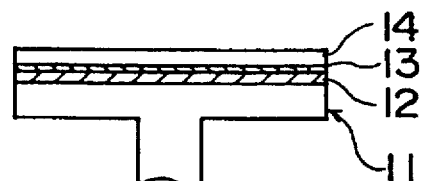

A step Sd shown in FIG. 6 coats a photosensitive resist layer 14 on the strain gage layer 13 as shown in FIG. 7D. This photosensitive resist layer 14 is formed to a thickness of 0.5 μm to 2 μm, for example.

Figure 7E:
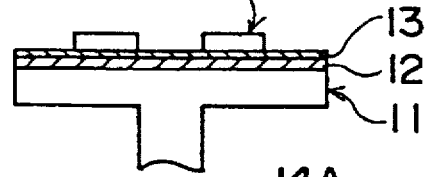

A step Se shown in FIG. 6 carries out known photolithography and etching processes with respect to the structure shown in FIG. 7D, and forms a resist pattern 14A as shown in FIG. 7E.

Figure 7F:
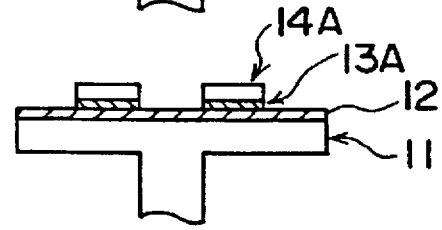

A step Sf shown in FIG. 6 etches the strain gage 13 using the resist pattern 14A as a mask and forms a strain gage pattern 13A that forms the strain gage 3 as shown in FIG. 7F.

Figure 7G:
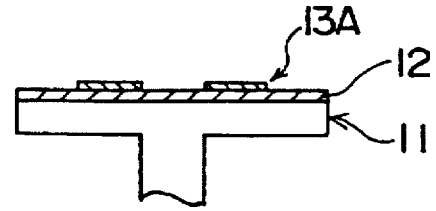

A step Sg shown in FIG. 6 removes the resist pattern 14A using a known resist remover as shown in FIG. 7G.

Figure 7H:
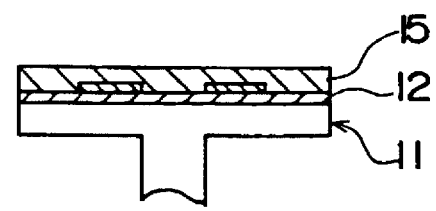

A step Sh shown in FIG. 6 forms a protection layer 15 on the structure shown in FIG. 7G as shown in FIG. 7H, so as to protect the strain gage pattern 13A. The protection layer 15 is made of an organic insulator material, for example. This protection layer 15 covers portions of the strain gage pattern 13A other than terminal portions of the strain gage pattern 13A.

The pointing device that is produced in this manner is mounted on the keyboard or the like. The mounting position of the pointing device is not limited to a specific position, but since a relatively small pointing device can be produced in this embodiment, it is possible to arrange the pointing device between keys of the keyboard.

Figure 8:
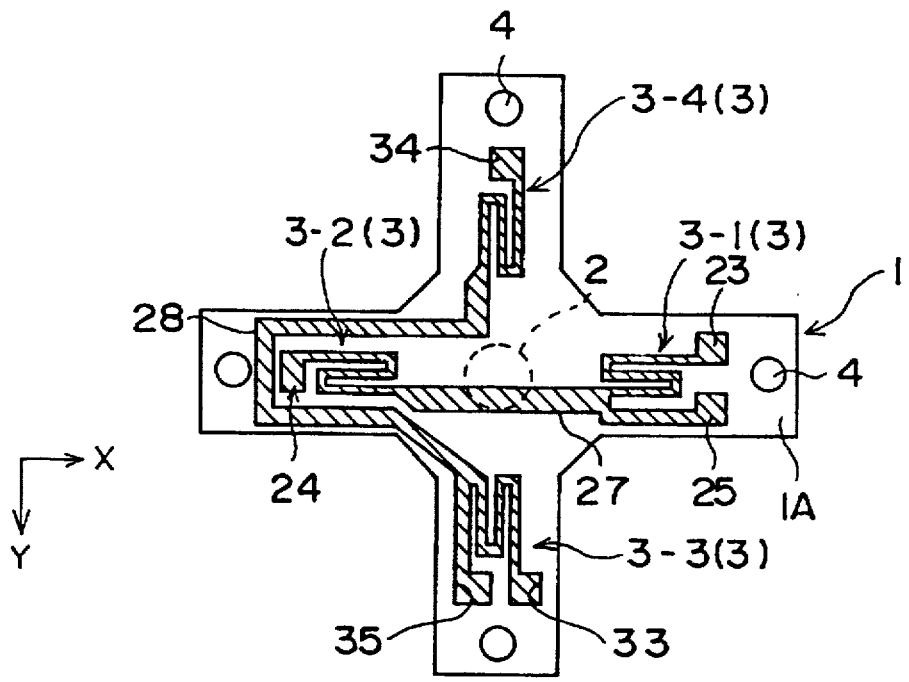
FIG. 8 is a bottom view showing a substrate of a second embodiment of the pointing device according to the present invention.

Next, a description will be given of a second embodiment of the pointing device according to the present invention, by referring to FIG. 8. FIG. 8 shows a bottom view of the second embodiment. In FIG. 8, those parts which are the same as those corresponding parts in FIGS. 2 and 3 are designated by the same reference numerals, and a description thereof will be omitted.

In this embodiment, strain gage patterns 3-1 through 3-4 indicated by the hatching in FIG. 8 are formed on the lower surface 1A of the substrate 1. The strain gage patterns 3-1 through 3-4 are made of CuNi, and have a thickness of approximately 2000Å. Portions of the strain gage patterns 3-1 through 3-4 excluding terminals portions including terminals 23 through 25 and terminals 33 through 35 are covered by an acrylic protection layer. The strain gage patterns 3-1 and 3-2 are connected via a wiring portion 27, and the strain gage patterns 3-3 and 3-4 are connected via a wiring portion 28.

For the sake of convenience, it will be assume that, out of the strain gage patterns 3-1 through 3-4, the strain gage patterns 3-1 and 3-2 respectively detect displacements of the stick 2 in the directions +X and −X, and the strain gage patterns 3-3 and 3-4 respectively detect displacements of the stick 2 in the directions +Y and −Y. The strain gage patterns 3-1 and 3-2 and the strain gage patterns 3-3 and 3-4 are essentially the same patterns except for the wiring portions.

In FIG. 8, when a force is applied to displace the tip end of the stick 2 in the direction —X, that is, towards the right, a tensile strain is introduced at the strain gage pattern 3-1 and a compressive strain is introduced at the strain gage pattern 3-2. As a result, the resistance of the strain gage pattern 3-1 increases, and the resistance of the strain gage pattern 3-2 decreases. Accordingly, when a driving voltage Vcc is applied across the terminals 23 and 24, a voltage at a half bridge output terminal 25 changes depending on the changes in the above resistances. By detecting this voltage change, it is possible to detect the magnitude of the force applied on the tip end of the stick 2 in the direction X, that is, the moving distance of the cursor or pointer on the display screen in the direction X.

Similarly, when a force is applied to displace the tip end of the stick 2 in the direction +Y, that is, towards the bottom, a tensile strain is introduced at the strain gage pattern 3-3 and a compressive strain is introduced at the strain gage pattern 3-4. As a result, the resistance of the strain gage pattern 3-3 increases, and the resistance of the strain gage pattern 3-4 decreases. Hence, when the driving voltage Vcc is applied across the terminals 33 and 34, a voltage at a half bridge output terminal 35 changes depending on the changes in the above resistances. By detecting this voltage change, it is possible to detect the magnitude of the force applied on the tip end of the stick 2 in the direction Y, that is, the moving distance of the cursor or pointer on the display screen in the direction Y.

Therefore, by detecting the voltage changes at the terminals 25 and 35, it is possible to detect the magnitude and direction of the force applied on the tip end of the stick Z, that is, the moving direction and the moving distance of the cursor or pointer on the display screen.

Figure 9:
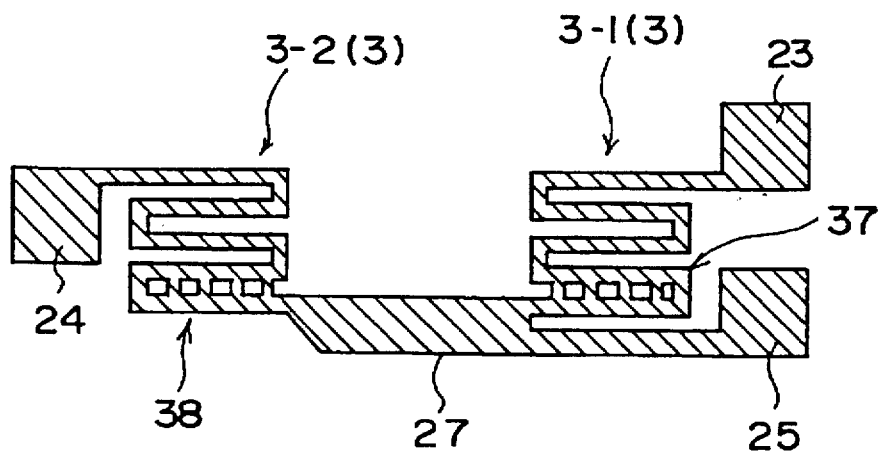
FIG. 9 is a bottom view showing another embodiment of a strain gage pattern.

FIG. 9 shows another embodiment of the strain gage pattern. In FIG. 9, those parts which are the same as those corresponding parts in FIG. 8 are designated by the same reference numerals, and a description thereof will be omitted.

For the sake of convenience, it will be assumed that the strain gage patterns 3-1 and 3-2 shown in FIG. 9 detect the displacement of the stick 2 in the direction X. The displacement of the stick 2 in the direction Y can be detected by strain gage patterns similar to the strain gage patterns 3-1 and 3-2 shown in FIG. 9, and illustration and description related to the strain gage patterns used for detecting the displacement of the stick 2 in the direction Y will be omitted.

The strain gage patterns 3-1 and 3-2 shown in FIG. 9 respectively have trimming patterns 37 and 38. The trimming patterns 37 and 38 are formed simultaneously with the strain gage patterns 3-1 and 3-2. The resistances of the strain gage patterns 3-1 and 3-2 can be adjusted by trimming portions of the trimming patterns 37 and 38 if necessary. Hence, in an initial state where no force is applied on the tip end of the stick 2, it is possible to adjust the resistances of the strain gage patterns 3-1 and 3-2 (3-3 and 3-4) so that the output voltage from the output terminal 25 (35) of the strain gage patterns 3-1 and 3-2 (3-3 and 3-4), that is, the offset voltage, becomes constant.

According to this embodiment, it is possible to suppress the inconsistency of the offset voltage from the strain gage patterns in the initial state, thereby making it easier to make a signal processing with respect to the outputs of the strain gages. Of course, the shapes of the trimming patterns 37 and 38 are not limited to those shown in FIG. 9, and the trimming patterns 37 and 38 may have any shape that enables adjustment of the resistances when trimmed.

Next, a description will be given of a third embodiment of the pointing device according to the present invention. In this embodiment, reference patterns having the half bridge structure are formed on the lower surface 1A of the substrate 1 with the same pattern dimensions as the strain gage patterns and using the same material as the strain gage patterns, in addition to forming the strain gage patterns. The reference patterns are formed at a portion of the substrate 1 where the strain is unlikely to be generated. For example, in the case of the second embodiment shown in FIG. 8, the portions of the substrate 1 in the vicinities of the holes 4 are fixed when mounting the pointing device, and the strain is unlikely to be generated in such portions. Since the reference patterns essentially have the same resistances as the corresponding strain gage patterns, it is possible to generate reference voltages that are extremely close to the offset voltages of the strain gage patterns in the initial state using the reference patterns.

Figure 10:
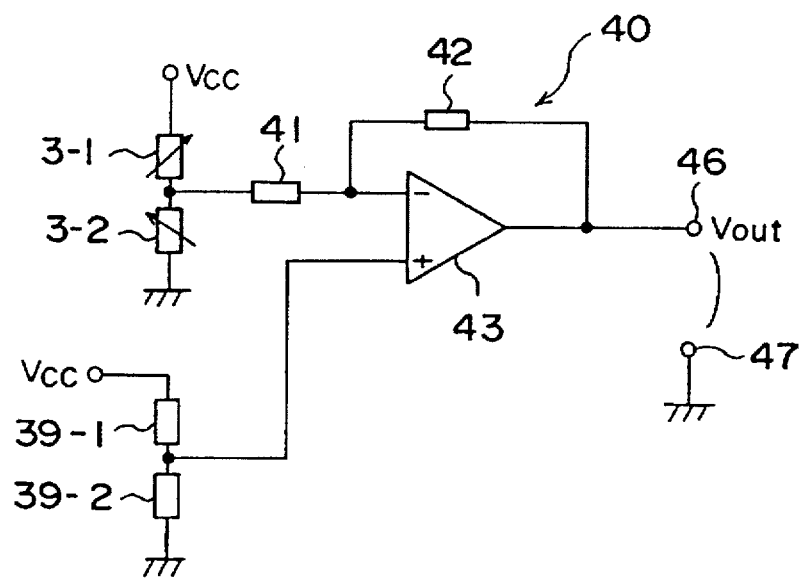
FIG. 10 is a circuit diagram showing a signal processing circuit.

FIG. 10 is a circuit diagram showing a part of a signal processing circuit which carries out a signal processing with respect to outputs of the pointing device.

A signal processing circuit 40 shown in FIG. 10 includes resistors 41 and 42 and an operational amplifier 43. For the sake of convenience, FIG. 10 only shows a circuit part of the signal processing circuit 40 provided with respect to the strain gage patterns 3-1 and 3-2. A voltage which is obtained by dividing a power supply voltage Vcc by the resistances of the strain gage patterns 3-1 and 3-2 is applied to an inverting input terminal of the operational amplifier 43. In addition, an output voltage of the operational amplifier 43 is fed back to the inverting input terminal of the operational amplifier 43 via the resistor 42. On the other hand, a reference voltage which is obtained by dividing the power supply voltage Vcc by the resistances of reference patterns 39-1 and 39-2 is applied to a non-inverting input terminal of the operational amplifier 43. A output voltage Vout generated across output terminals 46 and 47 indicates that the stick 2 was displaced in the direction X and also indicates the displacement quantity.

As described above, The reference patterns 39-1 and 39-2 have the half bridge structure, and are formed on the lower surface 1A of the substrate 1 at the portions where the strain is unlikely to be generated. In addition, the reference patterns 39-1 and 39-2 are made of the same material and have the same pattern dimensions as the strain gage patterns 3-1 and 3-2, so that the reference patterns 39-1 and 39-2 have essentially the same resistances as the strain gage patterns 3-1 and 3-2. For this reason, the reference voltage applied to the non-inverting input terminal of the operational amplifier 43 is extremely close to the offset voltage of the strain gage patterns 3-1 and 3-2 in the initial state, and the amplification of the operational amplifier 43 can be set large.

Figure 11:
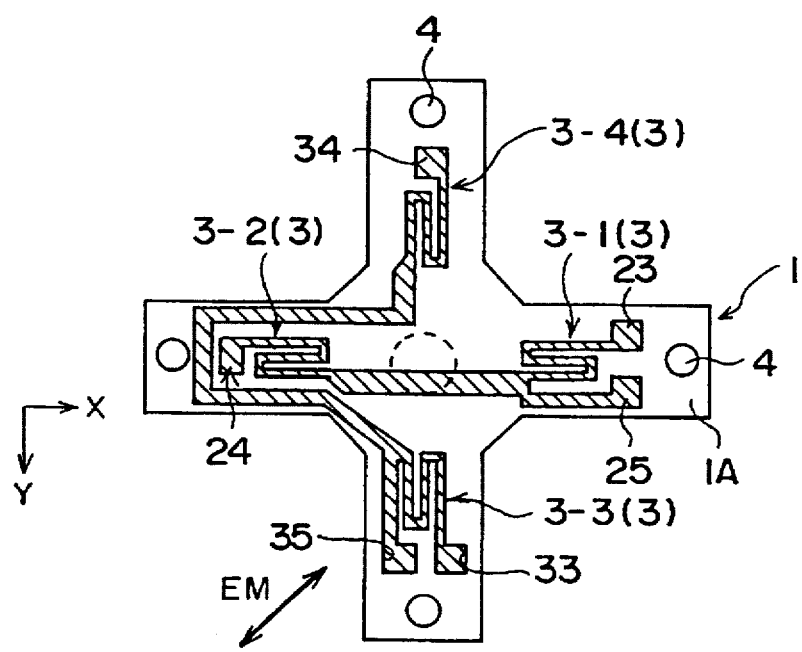
FIG. 11 is a bottom view showing a substrate of a fourth embodiment of the pointing device according to the present invention.

Next, a description will be given of a fourth embodiment of the pointing device according to the present invention, by referring to FIG. 11. FIG. 11 shows a bottom view of the fourth embodiment. In FIG. 11, those parts which are the same as those corresponding parts in FIG. 8 are designated by the same reference numerals, and a description thereof will be omitted.

In this embodiment, the strain gage patterns 3-1 through 3-4 indicated by the hatching in FIG. 11 are made up of a Ni76%-Fe thin film having a positive magnetostriction constant and a magneto-resistance effect characteristic. The Ni76%-Fe thin film has an axis of easy magnetization in a direction EM in FIG. 11. In other words, this Ni76%-Fe thin film has the axis of easy magnetization in the direction EM which is parallel to the lower surface 1A of the substrate 1 and is inclined by approximately 45° with respect to the longitudinal directions of the strain gage patterns 3-1 through 3-4.

Figure 12:
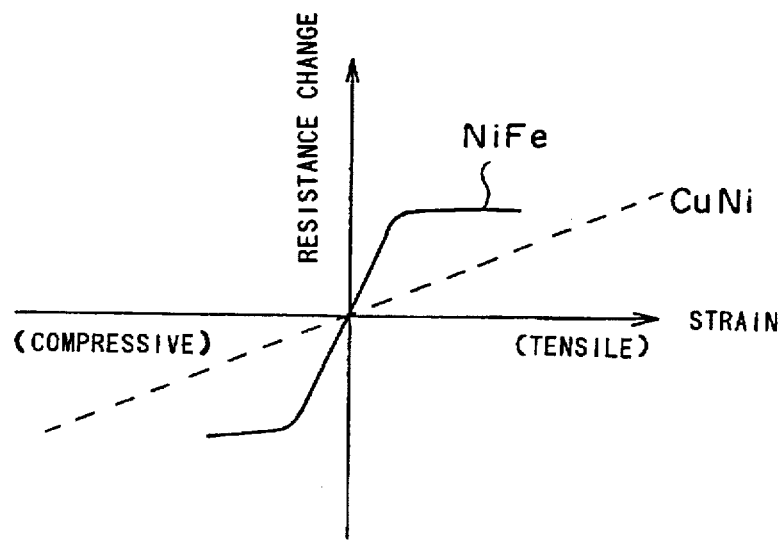
FIG. 12 is a diagram for explaining a resistance change characteristic of a strain gage pattern of the fourth embodiment.

FIG. 12 shows a resistance change characteristic of the strain gage pattern with respect to the strain. In FIG. 12, the ordinate indicates the resistance change (change in the resistance), and the abscissa indicates the strain. On the abscissa, the left side of the ordinate (zero resistance change) indicates the compressive strain, and the right side of the ordinate indicates the tensile strain. In FIG. 12, a solid line NiFe indicates the resistance change characteristic of the strain gage patterns 3-1 through 3-4 which are made of Ni76%-Fe thin film, with respect to the strain. On the other hand, a dotted line CuNi indicates the resistance change characteristic of the strain gage patterns 3-1 through 3-4 which is made of a CuNi alloy thin film, with respect to the strain. From these resistance change characteristics shown in FIG. 12, it can be seen that, when strained, the resistance change of the strain gage patterns 3-1 through 3-4 which is made of the Ni76%-Fe thin film is large compared to the resistance change of the strain gage patterns 3-1 through 3-4 which is made of the CuNi alloy thin film. Hence, in this embodiment, it is possible to realize a pointing device having a high sensitivity such that a small force applied to the tip end of the stick 2 is detectable, even when the displacement quantity of the stick 2 due to the force applied on the tip end of the stick 2 is small and the strain generated thereby at the strain gage patterns 3-1 through 3-4 is extremely small.

Figure 13:
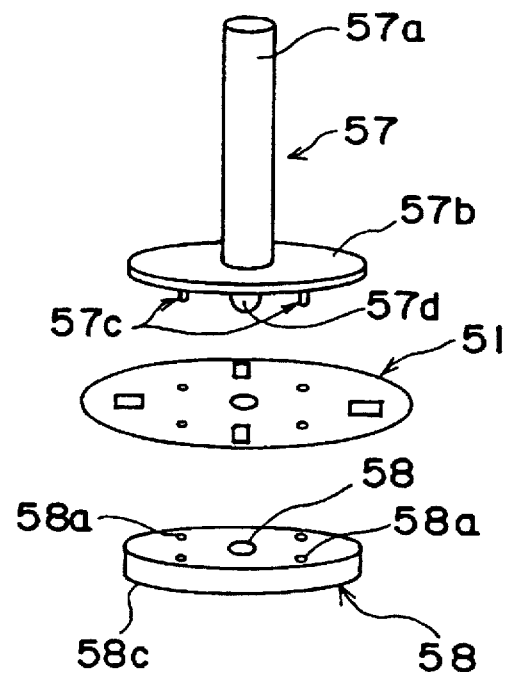
FIG. 13 is a disassembled perspective view showing a fifth embodiment of the pointing device according to the present invention.
Figure 14:
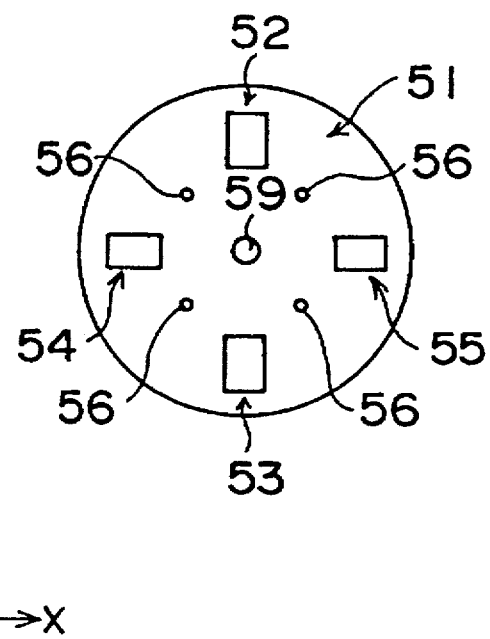
FIG. 14 is a bottom view showing a substrate of the fifth embodiment.
Figure 15:
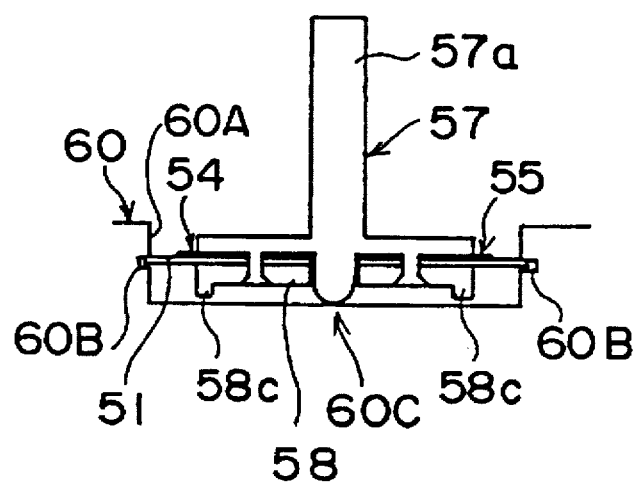
FIG. 15 is a cross sectional view showing an initial state where no force is applied on a tip end of a stick of the fifth embodiment.
Figure 16:
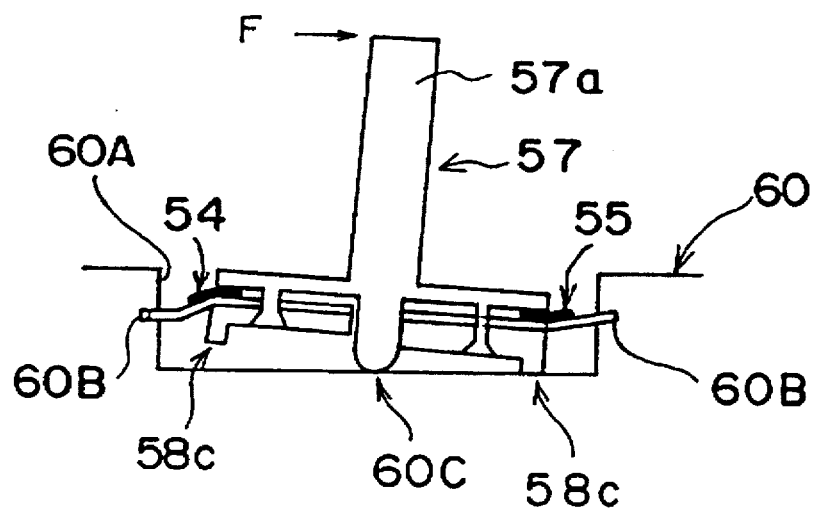
FIG. 16 is a cross sectional view showing a state where a force is applied on the tip end of the stick of the fifth embodiment.

Next, a description will be given of a fifth embodiment of the pointing device according to the present invention, by referring to FIGS. 13 through 16. FIG. 13 shows a disassembled perspective view of the fifth embodiment, and FIG. 14 shows a plan view of a substrate of the fifth embodiment. In addition, FIG. 15 is a cross sectional view showing an initial state where no force is applied to a stick of the fifth embodiment, and FIG. 16 is a cross sectional view showing a state where a force is applied on the stick of the fifth embodiment.

In this embodiment, the pointing device generally includes a substrate 51, a manipulating part 57, and a support 58 as shown in FIG. 13. The substrate 51 and the support 58 respectively have a generally circular or disk shape.

As shown in FIG. 14, the substrate 51 is made of a thin resilient disk-shaped plate. A center hole 59 is provided at the central portion of the substrate 51, and mounting holes (or positioning holes) 56 are provided on the periphery of the center hole 59. Strain gages 52 through 55 are provided on the upper surface of the substrate 51 at 90° angular intervals. The strain gages 52 and 53 detect the displacement in the direction Y and the displacement quantity of the manipulating part 57. The strain gages 54 and 55 detect the displacement in the direction X and the displacement quantity of the manipulating part 57. In FIG. 14, the strain gages 52 through 55 are provided outwardly of the periphery of the mounting holes 56; however, the positional relationship of the strain gages 52 through 55 and the mounting holes 56 is not limited to that shown.

The substrate 51 may be made of a metal plate such as a hollow metal substrate having an insulator layer formed thereon, resins, glass, ceramics, monocrystals such as silicon, printed substrate materials such as epoxy-glass, and the like. The strain gages 52 through 55 may be provided independently of each other (i.e., individually) on the substrate 51 but, preferably, the strain gages 52 through 55 are simultaneously printed on the substrate 51 in one process. The strain gages 52 through 55 may be printed on the substrate 51 using techniques such as evaporation and sputtering, printing techniques using conductive ink or the like, and photolithography techniques using photolithography and etching. When the strain gages 52 through 55 are printed simultaneously on the substrate 51, it is possible to suppress the inconsistency in the characteristics of the strain gages 52 through 55, and the strain detection accuracy is thereby improved. Of course, the strain gages 52 through 55 may be provided on the lower surface of the substrate 51.

The manipulating part 57 includes a stick 57a, a disk-shaped support portion 57b, a mounting portions (or positioning portions) 57c, and a spherical fulcrum portion 57d. For example, the manipulating part 57 is made of a resin and integrally includes the stick 57a, the support portion 57b, the mounting portions 57c and the fulcrum portion 57d.

The support 58 includes mounting holes 58a, a center hole 58b, and a ring-shaped stopper 58c which projects downwards. The center hole 58b has a diameter corresponding to the diameter of the fulcrum portion 57d of the manipulating part 57. In addition, the diameter of the support 58 is approximately the same as the diameter of the support portion 57b of the manipulating part 57, and is smaller than the diameter of the substrate 51.

The mounting portions 57c of the manipulating part 57 penetrate the corresponding mounting holes 56 in the substrate 51, and fit into the corresponding mounting holes 58a in the support 58. Further, the fulcrum portion 57d of the manipulating part 57 penetrates the center hole 59 in the substrate 51 and the center hole 58b in the support 58.

The substrate 51 of the pointing device is sandwiched between the manipulating part 57 and the support 58. As shown in FIG. 15, this pointing device is mounted on a base 60 of a keyboard or the like. A circular recess 60A is provided in the base 60, and a groove 60B is provided on the wall defining this recess 60A. The pointing device is mounted on the base 60 in a state where the entire outer periphery or a part of the outer periphery of the substrate 51 fits into the groove 60B.

In the initial state shown in FIG. 15, the stick 57a is displaceable in an arbitrary direction about a fulcrum 60C on the base 60. When an excessively large force is applied on the tip end of the stick 57a, there is a possibility that the outer periphery of the substrate 51 will be broken, and thus, the stopper 58c is provided at the bottom of the support 58 in this embodiment. As a result, even if an excessively large force is applied on the tip end of the stick 57a, the stopper 58c will hit the surface within the recess 60A of the base 60 and the substrate 51 is prevented from being deformed over a predetermined amount.

As described above, the diameter of the support 58 is approximately the same as the diameter of the support portion 57b of the manipulating part 57, and is smaller than the diameter of the substrate 51. Hence, in a state where the manipulating part 57, the substrate 51 and the support 58 are assembled, the support portion 57b and the support 58 partially overlap each of the strain gages 52 through 55 in the plan view. As a result, when the tip end of the stick 57a is displaced in an arbitrary direction, the strain is most generated in the vicinities of the strain gages 52 through 55 because the outer periphery of the substrate 51 is held by the groove 60B, and the strain detection is facilitated.

In the initial state shown in FIG. 15, no strain is introduced at any of the strain gages 52 through 55. In this initial state, when the operator places his finger tip on the tip end of the stick 57a and tilts the stick 57a in the direction X, that is, to the right in FIG. 16, by applying a force F, a tensile strain is generated at the strain gage 55 on the right and a compressive strain is generated at the strain gage 54 on the left in FIG. 16. When such strains are generated at the strain gages 54 and 55, the resistances of the strain gages 54 and 55 change by amounts corresponding to the generated strains. Hence, by detecting the changes in the resistances of the strain gages 52 through 55, it is possible to detect the magnitude and direction of the force F applied on the tip end of the stick 57a, that is, the moving direction and the moving distance of the cursor or pointer on the display screen.

Although not visible in FIG. 14, it is desirable to provide a recess or the like on the lower surface of the support portion 57b of the manipulating part 57, at least at portions corresponding to the positions of the strain gages 52 through 55 on the substrate 51, so that a predetermined gap is formed between the lower surface of the support portion 57b and each of the strain gages 52 through 55. In this case, it is possible to prevent contact of the support portion 57b and the strain gages 52 through 55, and to protect the strain gages 52 through 55. In addition, when the strain gages 52 through 55 are provided on the lower surface of the substrate 51, it is desirable to provide a recess or the like on the upper surface of the support 58, at least at portions corresponding to the positions of the strain gages 52 through 55 on the lower surface of the substrate 51, so that a predetermined gap is formed between the upper surface of the support 58 and each of the strain gages 52 through 55. In this latter case, it is possible to prevent contact of the support 58 and the strain gages 52 through 55, and to protect the strain gages 52 through 55.

Of course, the shape of the substrate 51 is not limited to the disk shape shown in FIG. 14.

Figure 17:
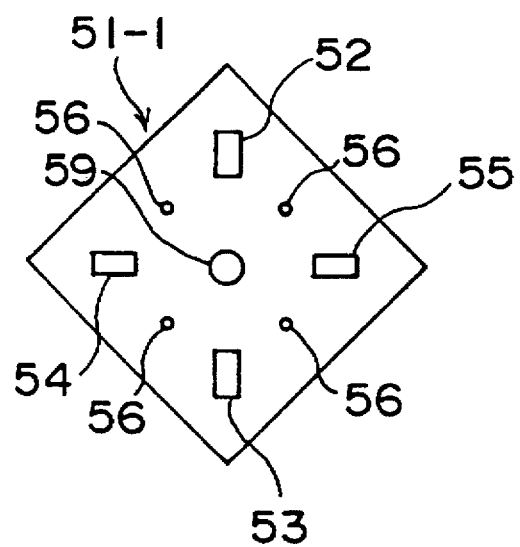
FIG. 17 is a bottom view showing a substrate of a sixth embodiment of the pointing device according to the present invention.

Next, a description will be given of a sixth embodiment of the pointing device according to the present invention, by referring to FIG. 17. FIG. 17 shows a plan view of a substrate of the sixth embodiment. In FIG. 17, those parts which are the same as those corresponding parts in FIG. 14 are designated by the same reference numerals, and a description thereof will be omitted.

In this embodiment, the pointing device includes a generally square substrate 51-1. The manipulating part and the support of the pointing device are similar to the manipulating part 57 and the support 58 shown in FIG. 13.

When the square substrate 51-1 is used, it is possible to simultaneously form a plurality of the strain gages 52 through 55 on a single substrate, and thereafter linearly cut this single substrate into a plurality of substrates 51-1. Compared to the case where the disk-shaped substrate 51 is used, it is possible to improve the mass production of the pointing device by use of the square substrate 51-1.

Figure 20:
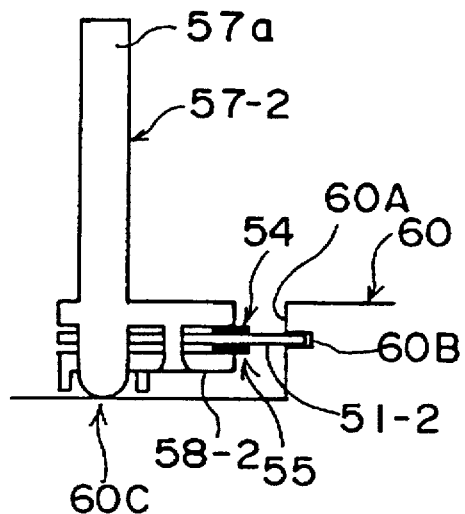
FIG. 20 is a cross sectional view showing an initial state where no force is applied on a tip end of a stick of the seventh embodiment.
Figure 21:
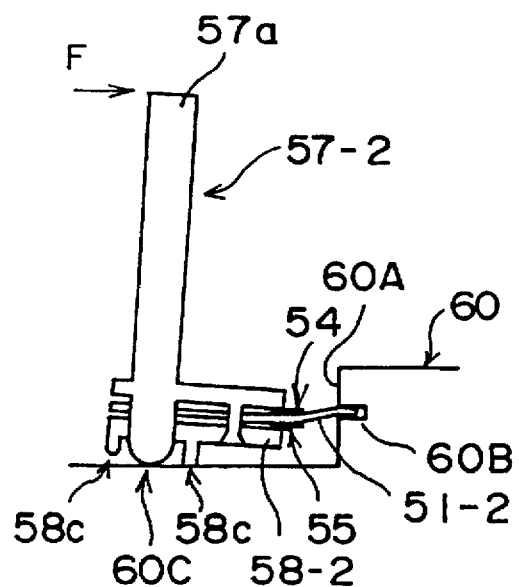
FIG. 21 is a cross sectional view showing a state where a force is applied on the tip end of the stick of the seventh embodiment.

Next, a description will be given of a seventh embodiment of the pointing device according to the present invention, by referring to FIGS. 18 through 21. FIG. 18 shows a disassembled perspective view of the seventh embodiment. FIG. 19A shows a plan view of a substrate of the seventh embodiment, and FIG. 19B shows a cross sectional view of the substrate of the seventh embodiment. FIG. 20 is a cross sectional view showing an initial state where no force is applied on a stick of the seventh embodiment, and FIG. 21 is a cross sectional view showing a state where a force is applied on the stick of the seventh embodiment. In FIGS. 18 through 21, those parts which are basically the same as those corresponding parts in FIGS. 13 through 16 are designated by the same reference numerals.

In this embodiment, the pointing device shown in FIG. 18 includes a generally rectangular substrate 51-2, a manipulating part 57-2, and a fan-shaped support 58-2, generally a quadrant (i.e., a 90° segment) of a circle.

The substrate 51-2 is made up of a thin rectangular resilient plate. A hole 59 is provided at a top left corner portion of the substrate 51-2 as shown in FIG. 19A, and mounting holes (or positioning holes) 56 are provided in the periphery of this hole 59. In addition, as shown in FIG. 19B, the strain gages 52 and 54 are provided on the upper surface of the substrate 51-2 with an angular separation of 90°. Further, strain gages 53 and 55 are provided on the lower surface of the substrate 51-2 with an angular separation (i.e., relative orientation) of 90° as shown in FIG. 19B. The strain gage 52 is provided at a position confronting the strain gage 53, and the strain gage 54 is provided at a position confronting the strain gage 55. The strain gages 52 and 53 detect the displacement in the direction Y and the displacement quantity of the manipulating part 57-2, and the strain gages 54 and 55 detect the displacement in the direction X and the displacement quantity of the manipulating part 57-2. In FIGS. 19A and 19B, the strain gages 52 through 55 are provided outwardly of the periphery of the mounting holes 56, however, the positional relationship of the strain gages 52 through 55 and the mounting holes 56 is not limited to that shown.

The substrate 51-2 may be made of a metal plate such as a hollow metal substrate having an insulator layer formed thereon, resins, glass, ceramics, monocrystals such as silicon, printed substrate materials such as epoxy-glass, and the like. The strain gages 52 through 55 may be provided independently on the substrate 51-2, but preferably, the strain gages 52 and 54 are simultaneously printed on the upper surface of the substrate 51-2 in one process and the strain gages 53 and 55 are simultaneously printed on the lower surface of the substrate 51-2 in one process. The strain gages 52 through 55 may be printed on the substrate 51-2 using techniques such as evaporation and sputtering, printing techniques using conductive ink or the like, and photolithography techniques using photolithography and etching. When the strain gages 52 through 55 are printed on the upper and lower surfaces of the substrate 51-2, it is possible to suppress the inconsistency in the characteristics of the strain gages 52 through 55, and the strain detection accuracy is thereby improved.

The manipulating part 57-2 includes a stick 57a, a fan-shaped support portion 57b having a configuration generally of a quadrant (i.e., a 90° segment) of a circle, a mounting portions (or positioning portions) 57c, and a spherical fulcrum portion 57d. For example, the manipulating part 57-2 is made of a resin and integrally includes the stick 57a, the support portion 57b, the mounting portions 57c and the fulcrum portion 57d.

The fan-shaped support 58-2 includes mounting holes 58a, a hole 58b, and a stopper 58c which projects downwards. The hole 58b has a diameter corresponding to the diameter of the fulcrum portion 57d of the manipulating part 57-2. In addition, the radial dimension of the support 58-2 is approximately the same as that of the support portion 57b of the manipulating part 57-2, and both are smaller than the maximum with of the substrate 51-2 in the "x" direction and, as seen in FIG. 20, the curved edge is located about middle position of gauge 54 in the X direction.

The mounting portions 57c of the manipulating part 57-2 penetrate the corresponding mounting holes 56 in the substrate 51-2, and fit into the corresponding mounting holes 58a in the support 58-2. Further, the fulcrum portion 57d of the manipulating part 57-2 penetrates the hole 59 in the substrate 51-2 and the hole 58b in the support 58-2.

The substrate 51-2 of the pointing device is sandwiched between the manipulating part 57-2 and the support 58-2. As shown in FIG. 20, this pointing device is mounted on the base 60 of the keyboard or the like. A fan-shaped recess 60A is provided in the base 60, and a groove 60B is provided on the wall defining this recess 60A. The pointing device is mounted on the base 60 in a state where the entire outer periphery or a part of the outer periphery of the substrate 51-2 fits into the groove 60B.

In the initial state shown in FIG. 20, the stick 57a is displaceable in an arbitrary direction about a fulcrum 60C on the base 60. When an excessively large force is applied on the tip end of the stick 57a, there is a possibility that the outer periphery of the substrate 51-2 will be broken, and thus, the stopper 58c is provided at the bottom of the support 58-2 in this embodiment. As a result, even if an excessively large force is applied on the tip end of the stick 57a, the stopper 58c will hit the surface within the recess 60A of the base 60 and the substrate 51-2 is prevented from being deformed over a predetermined amount.

As described above, the radial dimension of the support 58-2 is approximately the same as that of the support portion 57b of the manipulating part 57-2, and is smaller than the maximum "X" dimension of the substrate 51-2. Hence, in a state where the manipulating part 57-2, the substrate 51-2 and the support 58-2 are assembled, the support portion 57b and the support 58-2 partially overlap each of the strain gages 52 through 55 in the plan view. As a result, when the tip end of the stick 57a is displaced in an arbitrary direction, the strain is mostly generated in the vicinities of the strain gages 52 through 55 because the outer periphery of the substrate 51-2 is held by the groove 60B, and the strain detection is facilitated.

In the initial state shown in FIG. 20, no strain is introduced at any of the strain gages 52 through 55. In this initial state, when the operator places his finger tip on the tip end of the stick 57a and tilts the stick 57a in the direction X, that is, to the right in FIG. 21, by applying a force F, a tensile strain is generated at the strain gage 55 on the bottom right and a compressive strain is generated at the strain gage 54 on the top right in FIG. 21. When such strains are generated at the strain gages 54 and 55, the resistances of the strain gages 54 and 55 change by amounts corresponding to the generated strains. Hence, by detecting the changes in the resistances of the strain gages 52 through 55, it is possible to detect the magnitude and direction of the force F applied on the tip end of the stick 57a, that is, the moving direction and the moving distance of the cursor or pointer on the display screen.

When the size of the manipulating part 57-2 is reduced, the strains applied to each Of the strain gages 52 through 55 would originally be also reduced by a corresponding amount. However, in this embodiment, it is possible to prevent the outputs of the strain gages 52 through 55 from becoming small even when the manipulating part 57-2 is made small, by providing the strain gages 52 through 55 on both the upper and lower surfaces of the substrate 51-2. Therefore, the strain detecting accuracy will not deteriorate even when the size of the manipulating part 57-2 is reduced.

Although not visible in FIG. 18, it is desirable to provide a recess or the like on the lower surface of the support portion 57b of the manipulating part 57-2, at least at portions corresponding to the positions of the strain gages 52 and 54 on the upper surface of the substrate 51-2, so that a predetermined gap is formed between the lower surface of the support portion 57b and each of the strain gages 52 and 54. Similarly, it is also desirable to provide a recess or the like on the upper surface of the support 58-2, at least at portions corresponding to the positions of the strain gages 53 and 55 on the lower surface of the substrate 51-2, so that a predetermined gap is formed between the upper surface of the support 58-2 and each of the strain gages 53 and 55. In this case, it is possible to prevent contact of the support portion 57b and the strain gages 52 and 54, to prevent contact of the support 58-2 and the strain gages 53 and 55, and to accordingly protect the strain gages 52 through 55.

Of course, the shape of the substrate 51-2 is not limited to the rectangular shape shown in FIGS. 19A and 19B.

In the fifth through seventh embodiments described above, the shape of the substrates 51, 51-1 and 51-2, the shape of the support portions 57b of the manipulating parts 57 and 57-2, and the shape of the supports 58 and 58-2 are not limited to the described shapes. In addition, the diameter of the support portions 57b of the manipulating parts 57 and 57-2 and the diameter of the supports 58 and 58-2 only need to be smaller than the maximum diameter of the substrates 51, 51-1 and 51-2, and preferably, the support portions 57b of the manipulating parts 57 and 57-2 and the supports 58 and 58-2 partially overlap the strain gages 52 through 55 in the plan view.

Figure 22:
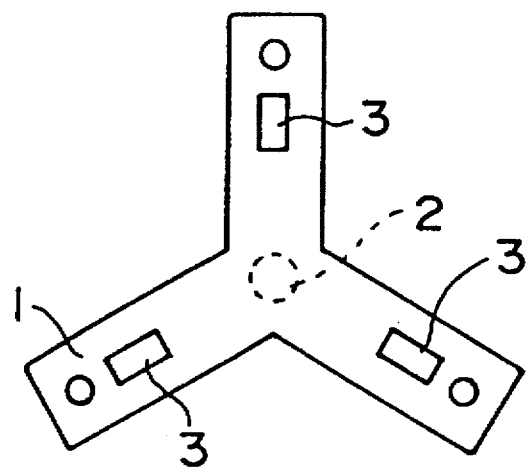
FIG. 22 is a bottom view showing a substrate of an eighth embodiment of the pointing device according to the present invention.

Next, a description will be given of an eighth embodiment of the pointing device according to the present invention, by referring to FIG. 22. FIG. 22 shows a bottom view of a substrate of the eighth embodiment. In FIG. 22, those parts which are the same as those corresponding parts in FIG. 3 are designated by the same reference numerals, and a description thereof will be omitted.

In this embodiment, three strain gages 3 are provided on the substrate 1 at 120° angular intervals.

In an initial stage, no strain is introduced at any of the strain gages 3. In this initial state, when the operator places his finger tip on the tip end of the stick 2 and tilts the stick 2 in an arbitrary direction by applying a force on the tip end, a tensile strain or a compress lye strain is introduced at each of the strain gages 3. When strains are introduced at each of the strain gages 3, the resistances of the strain gages 3 change depending on the strains introduced thereat. Hence, by detecting the changes in the resistances of each of the strain gages 3, it is possible to detect the magnitude and direction of the force applied on the tip end of the stick 2, that is, the moving direction and the moving distance of the cursor or pointer on the display screen.

Figure 23:
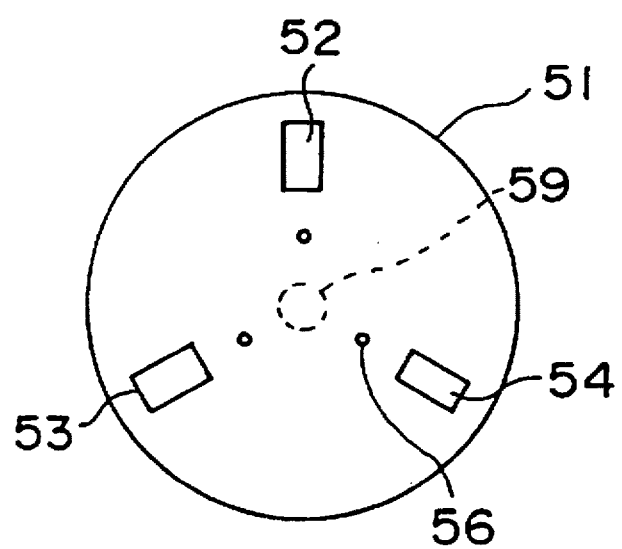
FIG. 23 is a bottom view showing a substrate of a ninth embodiment of the pointing device according to the present invention.

Next, a description will be given of a ninth embodiment of the pointing device according to the present invention, by referring to FIG. 23. FIG. 23 shows a bottom view of a substrate of the ninth embodiment. In FIG. 23, those parts which are the same as those corresponding parts in FIG. 14 are designated by the same reference numerals, and a description thereof will be omitted.

In this embodiment, three strain gages 52 through 54 are provided on the substrate 51 at 120° angular intervals.

In an initial stage, no strain is introduced at any of the strain gages 52 through 54. In this initial state, when the operator places his finger tip on the tip end of the stick 57a and tilts the stick 57a in an arbitrary direction by applying a force on the tip end, a tensile strain or a compressive strain is introduced at each of the strain gages 52 through 54. When strains are introduced at each of the strain gages 52 through 54, the resistances of the strain gages 52 through 54 change depending on the strains introduced thereat. Hence, by detecting the changes in the resistances of each of the strain gages 52 through 54, it is possible to detect the magnitude and direction of the force applied on the tip end of the stick 57a, that is, the moving direction and the moving distance of the cursor or pointer on the display screen.

In each of the embodiments described above, the cross sectional shape of the stick is of course not limited to the circular shape, and the shape of the substrate is not limited to the generally circular or rectangular shape. For example, the substrate may have any generally polygonal shape. Of course, in order to ensure that the stick can be tilted in any direction by the same amount when the magnitude of the applied force is the same, it is desirable that the shape of the substrate be symmetrical with respect to the center of the substrate.

In addition, the concept of providing the strain gages on both the upper and lower surfaces of the substrate as done in the seventh embodiment is similarly applicable to the first through sixth and eighth embodiments. However, because such applications can readily be understood by those skilled in the art, illustration and description related to such applications will be omitted.

Further, the present invention is not limited to these embodiments, but various variations and modifications may be made without departing from the scope of the present invention.

What is claimed is:

1. A pointing device comprising:
 a resilient substrate having flat upper and lower surfaces;
 a plurality of strain gages formed on at least one of the upper and lower surfaces of said substrate; and
 a stick having a base connected to a central portion of the upper surface of said substrate and a tip end opposite to the base and displaceable in an arbitrary direction, said stick extending perpendicularly to the upper surface of said substrate, a displacement direction and an extent of displacement of the tip end of said stick, relatively to the base thereof, being detectable from outputs of said strain gages.

2. The pointing device as claimed in claim 1, wherein said substrate has a generally cross-shape configuration.

3. The pointing device as claimed in claim 1, wherein said strain gages are printed on only a selected one of the upper and lower surfaces of said substrate, and said pointing device further comprises wirings connected to said strain gages and printed on said substrate together with said strain gages.

4. The pointing device as claimed in claim 3, wherein said wirings include adjustable patterns which render resistances of said strain gages adjustable.

5. The pointing device as claimed in claim 3, wherein said strain gages have both magneto-striction effect and magneto-resistance effect characteristics, and have an axis of easy magnetization in a direction inclined by approximately 45° with respect to a longitudinal direction of each said strain gage.

6. The pointing device as claimed in claim 3, wherein said wirings include reference resistors provided at portions of said substrate at which no strain is likely to be introduced, said reference resistors being provided for generating reference voltages.

7. The pointing device as claimed in claim 1, wherein said substrate includes a fixing portion on an outer periphery thereof, said pointing device being fixed on a support base via said fixing portion.

8. The pointing device as claimed in claim 1, wherein said substrate has a configuration of a generally circular shape.

9. The pointing device as claimed in claim 1, wherein said substrate has a configuration of a generally polygonal shape.

10. The pointing device as claimed in claim 8, wherein said stick includes a fulcrum portion which projects from said substrate and functions as a turning fulcrum when the tip end of said stick is displaced in the arbitrary direction.

11. The pointing device as claimed in claim 8, which further comprises a pair of support members having respective shapes, each corresponding to a shape of said substrate and supporting said substrate, said stick being fixed on one of said support members.

12. The pointing device as claimed in claim 11, wherein a maximum radial position of said strain gages on said substrate is greater than a maximum radius of each of said support members.

13. The pointing device as claimed in claim 8, wherein said substrate includes a fixing portion on an outer periphery thereof, said pointing device being fixed on a support base via said fixing portion.

14. The pointing device as claimed in claim 11, wherein an outer periphery of said substrate and said support members support the pointing device.

15. The pointing device as claimed in claim 1, wherein respective said strain gages are formed on the upper and lower surfaces of said substrate.

16. The pointing device as claimed in claim 1, which further comprises a pair of support members having respective shapes, each corresponding to a shape of said substrate, and supporting said substrate, said stick being fixed on one of said support members, the other of said support members having a stopper limiting the displacement of said stick to within a predetermined range.

17. The pointing device as claimed in claim 1, wherein said strain gages consist of four strain gages which are arranged on a selected one of the upper and lower surfaces of said substrate with a 90° angular separation between adjacent strain gages.

18. The pointing device as claimed in claim 1, wherein said strain gages consist of three strain gages which are arranged on only a selected one of the upper and lower surfaces of said substrate with a 120° angular separation between adjacent strain gages.

19. The pointing device as claimed in claim 18, which further comprises a pair of support members having respective shapes, each corresponding to a shape of said substrate, and supporting said substrate, said stick being fixed on one of said support members, the other of said support members having a stopper limiting the displacement of said stick to within a predetermined range.

20. The pointing device as recited in claim 1, wherein the strain gauges are printed on the substrate, effectively integrally with the substrate, by a selected one of printing, evaporating and sputtering techniques.

21. The pointing device as claimed in claim 1, wherein the strain gauges are formed effectively integrally with and on the at least one surface of the substrate.

22. The pointing device as claimed in claim 1, wherein the plurality of strain gauges are formed on the upper surface of said substrate.

23. The pointing device as claimed in claim 1, wherein the plurality of strain gauges are formed on the lower surface of said substrate.

* * * * *

UNITED STATES PATENT AND TRADEMARK OFFICE
CERTIFICATE OF CORRECTION

PATENT NO. : 5,640,178
DATED : June 17, 1997
INVENTOR(S) : ENDO et al.

It is certified that error appears in the above-identified patent and that said Letters Patent is hereby corrected as shown below:

Col. 1,  line 42, after "top" insert --,--.

Col. 6,  line 39, change "-X" to -- +X--.

Col. 12, line 27, change "with" to --width--;
         line 60, change "51-Z" to --51-2--.

Col. 13, line 20, change "Of" to --of--.

Col. 14, line 7, change "compress lye" to --compressive--.

Signed and Sealed this

Ninth Day of September, 1997

Attest:

BRUCE LEHMAN

Attesting Officer       Commissioner of Patents and Trademarks